(12) United States Patent
Thumbar

(10) Patent No.: US 11,374,461 B2
(45) Date of Patent: Jun. 28, 2022

(54) SEA WAVE ENERGY CONVERTER SYSTEM TO GENERATE ELECTRICITY USING PIONEER DEVICES LINED-UP IN PARTICULAR ARRANGEMENT

(71) Applicant: Rahul Thumbar, Rajkot (IN)

(72) Inventor: Rahul Thumbar, Rajkot (IN)

(73) Assignee: Rahul Thumbar, Rajkot (IN)

( * ) Notice: Subject to any disclaimer, the term of this patent is extended or adjusted under 35 U.S.C. 154(b) by 0 days.

(21) Appl. No.: 16/620,739

(22) PCT Filed: Jun. 7, 2018

(86) PCT No.: PCT/IN2018/050371
§ 371 (c)(1),
(2) Date: Dec. 9, 2019

(87) PCT Pub. No.: WO2018/225090
PCT Pub. Date: Dec. 13, 2018

(65) Prior Publication Data
US 2020/0204040 A1    Jun. 25, 2020

(30) Foreign Application Priority Data
Jun. 7, 2017   (IN) .............................. 201721019919

(51) Int. Cl.
*H02K 7/18*     (2006.01)
*F03B 13/22*    (2006.01)
(Continued)

(52) U.S. Cl.
CPC ........... *H02K 7/1823* (2013.01); *F03B 13/22* (2013.01); *H02K 7/003* (2013.01); *H02K 7/116* (2013.01)

(58) Field of Classification Search
CPC ...... H02K 7/1823; H02K 7/003; H02K 7/116; F03B 13/22; F03B 13/184; Y02E 10/30
(Continued)

(56) References Cited

U.S. PATENT DOCUMENTS

| 1,067,977 A | 7/1913 | Allen et al. |
| 3,687,567 A * | 8/1972 | Lininger ............... F03B 13/141 415/7 |

(Continued)

FOREIGN PATENT DOCUMENTS

| CN | 203009167 U | 6/2013 |
| CN | 103511168 B | 11/2015 |

OTHER PUBLICATIONS

International search report of PCT/IN2018/050371.
Written opinion of PCT/IN2018/050371.

*Primary Examiner* — Charles Reid, Jr.
(74) *Attorney, Agent, or Firm* — Dragon Sun Law Firm, PC; Jinggao Li, Esq.; Nathaniel Perkins

(57) ABSTRACT

A sea wave energy converter system, including a plurality of pioneer devices each of which is mounted on individual towers installed at a seabed, wherein each of the pioneer device includes an assembly having a set of gears connected to at least one fly wheel, at least one paddle, and a generator, wherein each of the pioneer devices mounted on the individual towers are lined-up in a particular arrangement covering a length of a sea crest so that incoming kinetic forces of sea waves rotates seriatim the at least one paddle of each of the pioneer devices to rotate the generator through the set of gears to generate electricity individually by each of the pioneer devices and wherein the particular arrangement is one of a diagonal arrangement, a cross arrangement, and a 'V' shaped arrangement.

21 Claims, 12 Drawing Sheets

(51) Int. Cl.
*H02K 7/00* (2006.01)
*H02K 7/116* (2006.01)

(58) Field of Classification Search
USPC .................................................. 290/42, 53
See application file for complete search history.

(56) References Cited

U.S. PATENT DOCUMENTS

| | | | | |
|---|---|---|---|---|
| 3,911,287 | A * | 10/1975 | Neville | F03B 13/1815 |
| | | | | 290/53 |
| 5,136,174 | A * | 8/1992 | Simoni | F03B 17/062 |
| | | | | 290/54 |
| 7,215,036 | B1 * | 5/2007 | Gehring | F03B 17/061 |
| | | | | 290/54 |
| 8,058,741 | B1 * | 11/2011 | Echemendia | F03B 7/00 |
| | | | | 290/53 |
| 8,120,197 | B2 * | 2/2012 | Branco | F03B 13/10 |
| | | | | 290/54 |
| 8,534,057 | B1 * | 9/2013 | Brown | F03B 17/068 |
| | | | | 60/398 |
| 2002/0195823 | A1 * | 12/2002 | Aguirre | F03B 13/184 |
| | | | | 290/53 |
| 2006/0273594 | A1 * | 12/2006 | Gehring | F03B 13/1885 |
| | | | | 290/42 |
| 2007/0122279 | A1 * | 5/2007 | Sredzki | F03B 17/063 |
| | | | | 416/84 |
| 2008/0260548 | A1 * | 10/2008 | Ahdoot | F04B 35/004 |
| | | | | 417/333 |
| 2010/0019499 | A1 * | 1/2010 | Perner | F03B 13/264 |
| | | | | 290/53 |
| 2010/0047071 | A1 * | 2/2010 | Patterson | F03B 13/1865 |
| | | | | 416/169 R |
| 2010/0084870 | A1 * | 4/2010 | Burcik | F03B 17/06 |
| | | | | 290/54 |
| 2011/0031753 | A1 * | 2/2011 | Moore | F03B 17/063 |
| | | | | 290/54 |
| 2011/0254275 | A1 * | 10/2011 | Joseph | F03B 13/144 |
| | | | | 290/53 |
| 2012/0032444 | A1 * | 2/2012 | Burton | F03B 13/22 |
| | | | | 290/53 |
| 2012/0119501 | A1 * | 5/2012 | Yeomans | F03B 13/264 |
| | | | | 290/54 |
| 2013/0069369 | A1 * | 3/2013 | Salehpoor | F03B 13/264 |
| | | | | 290/53 |
| 2015/0252776 | A1 * | 9/2015 | Van Rompay | F03B 13/264 |
| | | | | 290/54 |
| 2017/0030326 | A1 * | 2/2017 | Han | F03B 13/264 |
| 2018/0202414 | A1 * | 7/2018 | Hume | F03B 13/145 |
| 2020/0200144 | A1 * | 6/2020 | Thumbar | F03B 17/063 |

* cited by examiner

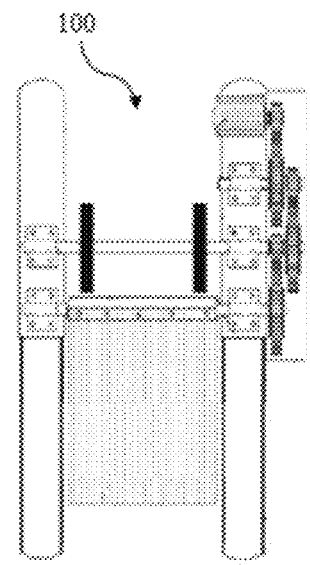
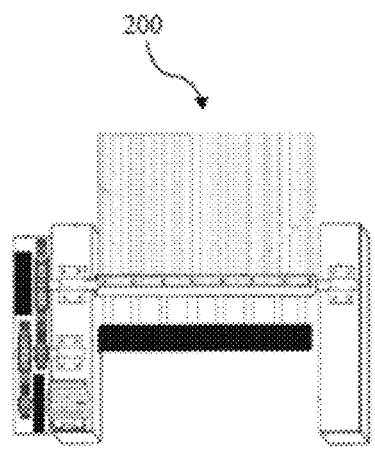
FIG.1  FIG.2
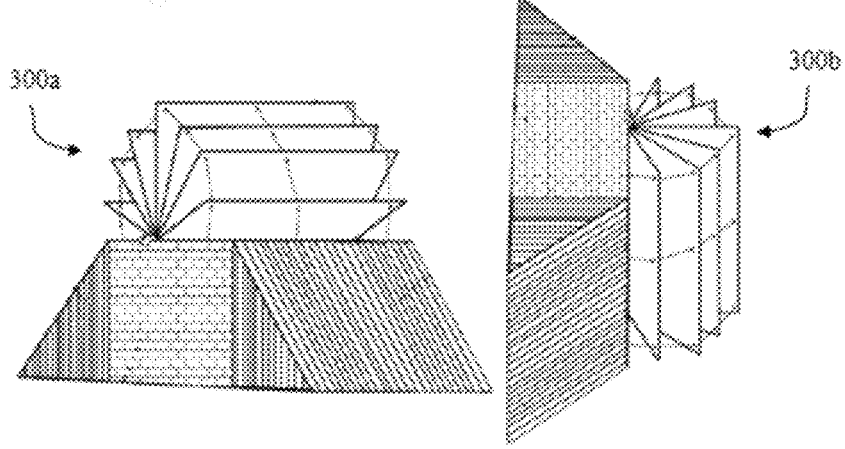
FIG.3a  FIG.3b

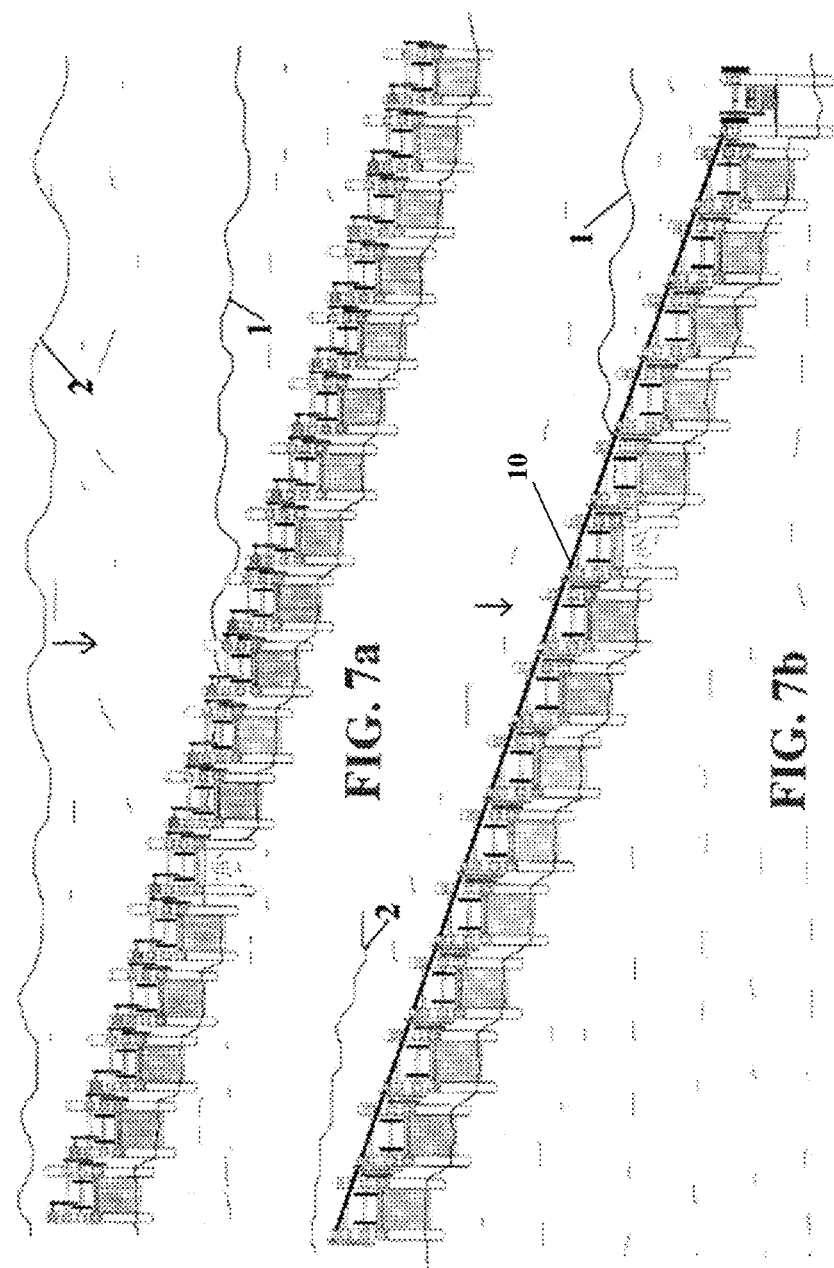

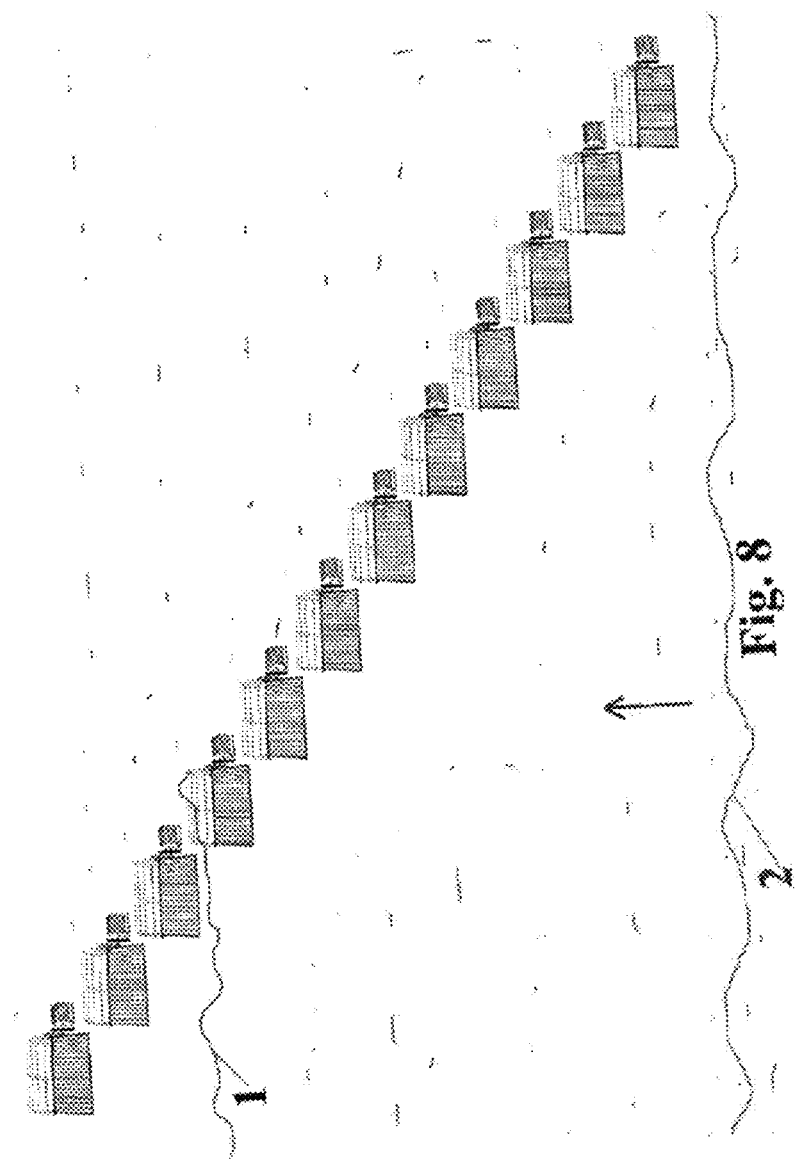

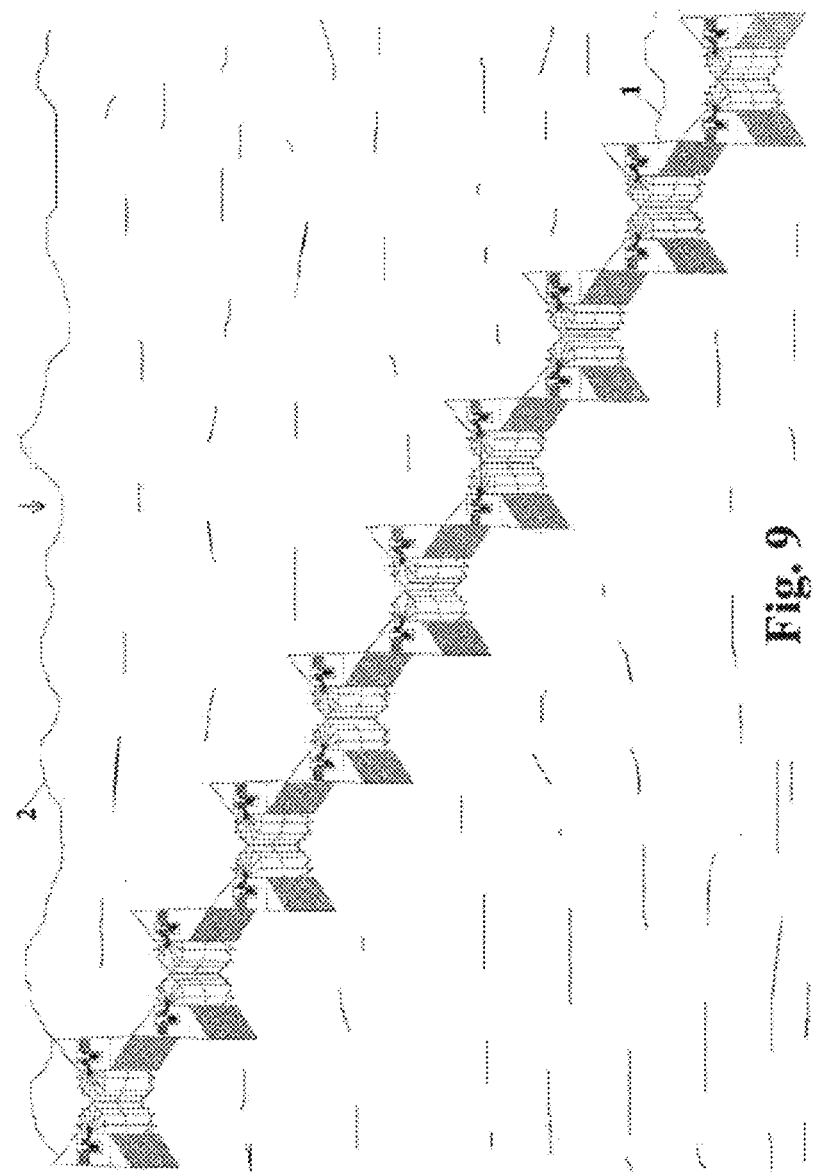

SEA WAVE ENERGY CONVERTER SYSTEM TO GENERATE ELECTRICITY USING PIONEER DEVICES LINED-UP IN PARTICULAR ARRANGEMENT

CROSS-REFERENCE TO RELATED APPLICATIONS

This application is a national stage application of PCT Application No. PCT/IN2018/050371. This application claims priority from PCT Application No. PCT/IN2018/050371, filed Jun. 7, 2017, Indian Application No. 201721019919 filed Jun. 7, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present invention related to systems and methods of sea waves power generation, and in particular relates to systems and methods for continual power generation from the sea waves.

BACKGROUND OF INVENTION

Energy is developing world's problems. World energy consumption has been increasing at one of the fastest rates due to population growth and economic development. Therefore, natural sources will be decreased in arrival days. Thus, clean renewable energies are good option for power generation, like sea waves.

Ocean waves are created by the interaction of wind with the surface of sea. The energy in waves comes from the movement of the ocean and the changing heights and speed of the swells. Kinetic energy, the energy of motion, in waves is tremendous. An average 4 foot, 10 second wave striking a cost puts out more than 290 megawatt per kilometer of coast. Waves have the potential to produce an unlimited source of renewable energy. Wave energy is an irregular and oscillating low frequency energy source that can be extracted and converted in to electricity by wave power machines. It can deploy either on the sea shore or in deeper waters offshore.

So, there is requirement to develop a simple, easier and economical system which has minimum maintenance and high yield of electricity. Thus the present specification, there is need art for "Continual sea waves power generation systems and methods for the 'Sea wave energy converter apparatus', the 'Sea wave energy conversion device' and the 'Wind power conversion device".

There are some basic methods for converting sea waves energy to power generation. Which have been subject to prior (1) Patent application Number 1774/MUM/2009, filed on dated Mar. 8, 2009, changed name of the title: —the "Sea wave energy converter apparatus", (2) patent application Number 1775/MUM/2009, filed on dated Mar. 8, 2009, changed name of the title: —the "Wind power conversion device", and (3) patent application Number 1776/MUM/2009, filed on dated Mar. 8, 2009, changed name of the title: —the "Sea wave energy conversion device," inventor: —Parsotam Panchabhai Thumbar.

Such above devices generate power, only at the same time of waves blowing, while between two wave periods devices do not work. So power generation cannot stay on continues.

OBJECT OF INVENTION

Object of the present invention overcome all the disadvantages of the prior art and be a useful alternative by providing a sea wave energy converter system to generate electricity using pioneer devices lined-up in a particular arrangement.

The diagonal shape or cross line up installed devices arrangement of present invention is intended to provide a more efficient, economic, and which will operate at higher efficiency, making it simple and suitable for continual waves conversion power generation.

SUMMARY OF INVENTION

An embodiment of the present invention provides continual power generation systems from the sea waves. Continual power generation systems for the sea waves has a diagonal shape devices arrangement for continual wave harnessing from one wave, cross line up arrangement of devices as 'V' shape or diagonal shape line up long row is for continual harness system of sea waves during the tides and large scale continual power generation, and Diagonal shape line up arrangement of devices for continual harness system of sea wave during the tides; by automation and tier installing multistory tower of the devices.

In an embodiment, a sea wave energy converter system is used to generate electricity using pioneer devices lined-up in a particular arrangement.

In an embodiment, the particular arrangement is one of a diagonal arrangement, a parallel arrangement, a cross arrangement, a horizontal arrangement, and 'V' shaped arrangement.

BRIEF DESCRIPTION OF THE DRAWINGS

FIG. 1 shows a pioneer front view of a sea wave energy conversion device.

FIG. 2 shows pioneer front view of a sea wave energy converter apparatus.

FIG. 3a shows a pioneer front view of a horizontal axis wind power conversion device and FIG. 3b shows a front view of vertical axis installation of the wind power conversion device depicted in FIG. 3a.

FIG. 7a illustrates cross or diagonal shape row arrangement of the sea wave energy conversion device of the FIG. 1 on the seabed/sea shore with individual generator. FIG. 7b illustrates cross or diagonal shape row arrangement of the device FIG. 1 on the seabed with one common main shaft and generator.

FIG. 8 illustrates cross or diagonal shape row arrangement of the sea wave energy converter device of the FIG. 3 a placed on the seabed with individual generator.

FIG. 9 illustrates cross or diagonal shape row arrangement of mirror with twin image of the vertical axis sea wave energy converter device FIG. 3b on the seabed with individual generator.

DETAILED DESCRIPTION OF THE INVENTION

The terms, "sea wave energy conversion device", "sea wave energy converter apparatus", "sea wave converter device", "pioneer device" and "wind power conversion device" are used interchangeably in the disclosure.

This present invention relates to continual renewable energy power generation from sea waves; here with arrangements, amendments systems and methods of pioneer devices (i.e., sea wave energy conversion device of the FIG. 1 is disclosed in the 1776/MUM/2009, Sea wave energy converter apparatus depicted in the FIG. 2 is disclosed in the 1774/MUM/2009, and wind power conversion device depicted in FIG. 3a is disclosed in the 1775/MUM/2009. For the sake of brevity, we are not disclosing same information again.

Figure 4:
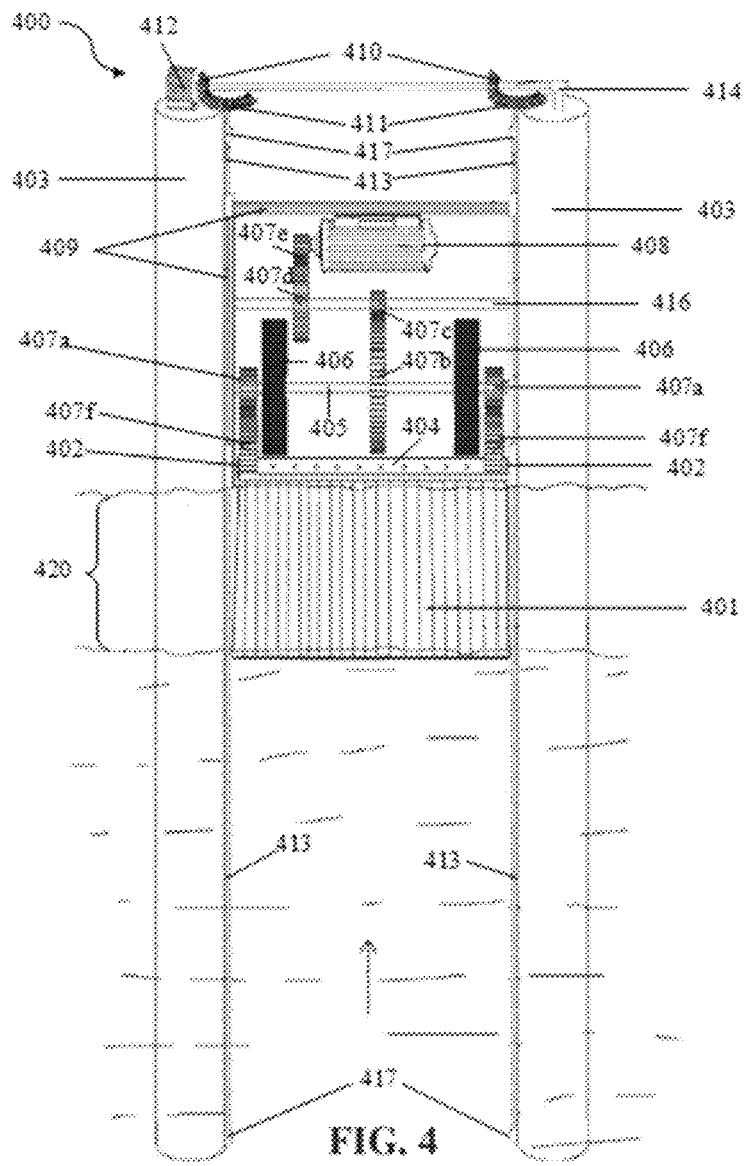
FIG. 4 illustrates automatic motorized screw gears operated and two pillars mounted at the sea wave converter device in accordance with an exemplary embodiment.

In some configurations and referring to the FIG. 4, an arrangement of Sea wave energy conversion device depicted in the FIG. 1 mounted on to desirable heighted tower (403) of the FIG. 4, this pioneer device up and down by electric motor operated screw gears (413). The device is settle on the screw gears with frame structure (409), and settled with gears (407b, 407c, 407d, 407e, and 407f and freewheeled 407a), flywheels (406), generator (408), and hanging paddle/ore (401). The paddle height is maintained similar according to crest height FIG. 4 (420) of sea waves.

Wherein, the pioneer device moves up and down automatically opposite of the sea wave crest to harness each sea wave even if low, medium and high tides for power generation.

In an embodiment, the sea wave conversion device (400) includes a pair of towers (403) connected with each other using a motor shaft. The motor shaft is attached to a stand (414). Each of the towers (403) including a plurality of screw gears (413) connected with an electric motor (412) using a bearing holder (417). A square frame structure (409) is connected to the paddle (401) and mounted on the pair of towers (403) to slide up and down in direction on the screw gears (413) of the pair of towers (403). The square frame structure (409) includes an assembly having a set of gears (407a-407e) connected to at least one of a pair of fly wheels (406), at least one paddle (401), and a generator (408) to generate electricity. Incoming kinetic forces of sea waves rotate the at least one paddle (401) to rotate the generator (408) through the set of gears (407a-407e) using the flywheels (406) to generate the electricity.

In an embodiment, the assembly includes a paddle shaft (404) connected to the square frame structure (409). The at least one paddle (401) is mounted on the paddle shaft (404). The paddle shaft (404) is mounted or connected on the square frame structure (409) using a free wheel. A counter shaft (405) is connected to the square frame structure (409) using a bearing. The counter shaft (405) includes the pair of fly wheels (406), a pair of small gears (407a) from the set of gears (407a-407e), and a first big gear (407b) from the set of gears (407a-407e). A generator shaft (416) is connected to the square frame structure (409). The generator shaft (416) includes a first small gear (407c) from the set of gears (407a-407e) connected to the first big gear (407b) and a second big gear (407d) from the set of gears (407a-407e). A second small gear (407e) from the set of gears (407a-407e) is connected to the second big gear (407d) and the generator (408) to generate the electricity based on the rotation.

In an embodiment, the electric motor (412) is mounted on top of one tower from the pair of towers (403) using a small gear (410) connected to the stand (414) to maintain a height of the at least one paddle (401). The big gear (411) is connected to the small gear (410) of the electric motor (412) and is mounted on the plurality of screw gears (413) to maintain the height of the at least one paddle (401).

In an embodiment, the at least one paddle (401) is positioned on face of a sea crest during waves such that the incoming kinetic forces of the sea waves fall on the at least one paddle (401) to rotate the at least one paddle (401).

In an embodiment, a height of the pair of towers (403) are adjustable and is dependent on at least one of a height the sea waves and a size of the at least one paddle (401).

In an embodiment, the paddle (401) is made from lightweight material to increase fast restore of the paddle (401) or from heavy material to increase gravity force for fast restore of the paddles (401).

In an embodiment, one or more paddle shaft (404) are arranged in parallel to continuously generate the electricity according to a sea water level of tide and a slope of a seabed.

In an embodiment, power of from the one or more paddle shaft (404) are used to generate continuously generate the electricity.

Figure 5:
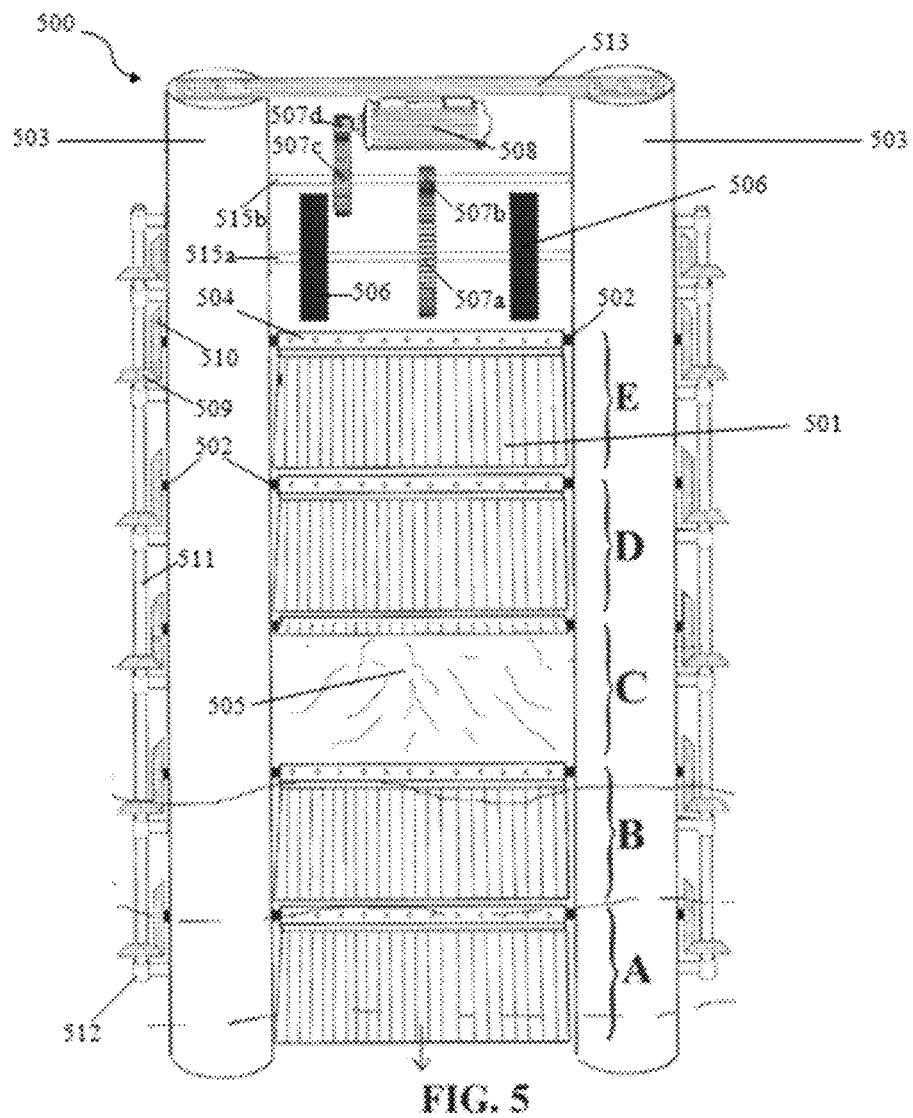
FIG. 5 illustrates tier arrangement of the sea wave energy conversion device depicted in the FIG. 1, as if multistory waves harnessing tower.

In some configurations and referring to FIG. 5, a tier installing (A, B, C, D, and E) arrangement multistory tower of the 'sea wave energy conversion device' depicted in the FIG. 1, where paddles (501) are installed as tier, except upper floor, mounted on two desirable heighted pillars/towers (503) with two sided vertical shafts (511) and gears (509, 510 with freewheels), while each paddle shafts are connected with gears (510), the both vertical shafts (511) connect by gears (509) with gear shaft (515a) to flywheels (506), gears (507a, 507b, 507c, 507d) and generator (508) fixed on the towers with stand FIG. 5 (513).

According to low, medium and high tides the crest of sea waves up and down, so any one paddle (501) of the multistory towers stay on opposite of similar leveled sea wave crest (505). Thus, sea waves harnessing process stay on continue even if tides.

In an embodiment, the assembly includes a paddle shaft (504) connected to the pair of towers (503). The paddle shaft (504) is provided with freewheel. The paddle shaft (504) is attached to the pair of towers (503) using a bearing (502). A counter shaft (515a) is connected to the pair of towers (503). The counter shaft (515a) is provided with the pair of fly wheels (506) and a first big gear (507a) from the set of gears (507a-507d). A generator shaft (515b) is connected to the pair of towers (503). The generator shaft (515b) includes a first small gear (507b) from the set of gears (507a-507d) connected to the first big gear (507a) and a second big gear (507c) from the set of gears (507a-507d). A second small gear (507d) from the set of gears (507a-507d) is connected to the second big gear (507c) and the generator (508) to generate the electricity based on the rotation.

In an embodiment, the at least one paddle (501) is positioned on face of a sea crest during waves such that the incoming kinetic forces of the sea waves falls on the at least one paddle (501) to rotate the at least one paddle (501).

In an embodiment, a height of the pair of towers (503) are adjustable and is dependent on at least one of a height of the sea waves and a size of the plurality of paddles (501).

In an embodiment, the paddles (501) are made from lightweight material to increase fast movement of the paddles (501) or from heavy material to increase gravity force for fast restore of the paddles (501).

In an embodiment, one or more paddle shaft (504) are arranged in parallel to continuously generate the electricity according to a sea water level of the tide and a slope of a seabed.

In an embodiment, power of from the one or more paddle shaft (504) are used to generate continuously generate the electricity.

In some configurations and referring to FIG. 6, FIG. 7a, FIG. 8, and FIG. 9 cross line up installing arrangement of pioneer devices, in order the sea wave energy converter apparatus depicted in the FIG. 2, the sea wave energy conversion device depicted in the FIG. 1, the wind power conversion device depicted in the FIG. 3a, and mirror imaged twin vertical installing arranged devices depicted in the FIG. 3b.

Figure 6:
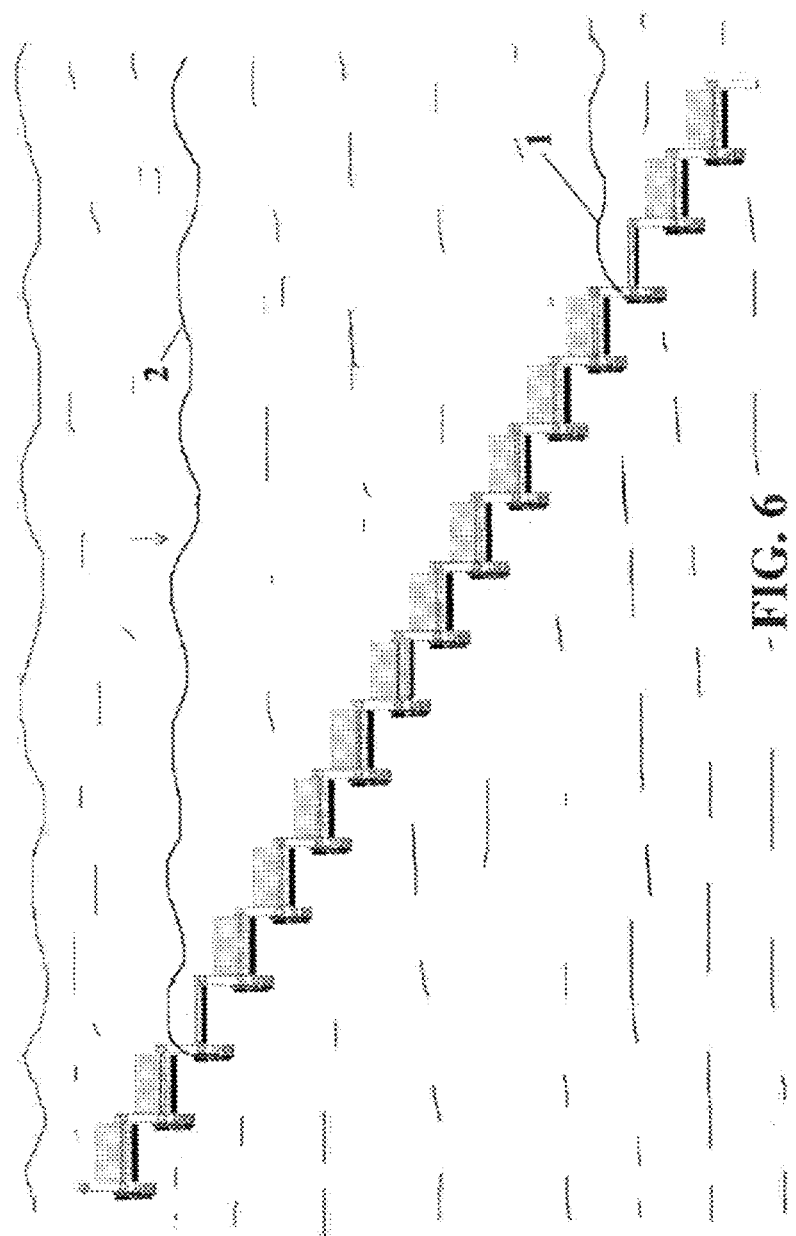
FIG. 6 illustrates cross or diagonal shape row arrangement of the sea wave energy converter apparatus of the FIG. 2 on the seabed/sea shore with individual generator, in accordance with an exemplary embodiment.

FIG. 6 illustrates a cross or diagonal shape row arrangement of the sea wave energy converter system depicted in the FIG. 2 on the seabed/sea shore with individual generator, according to the embodiment as disclosed herein.

As shown in the FIG. 6, each of the sea wave converter apparatus (200) is line-up in the particular arrangement (i.e., diagonal arrangement or cross arrangement) at different tidal zones of sea. The at least one paddle associated with each of the sea wave converter apparatus (200) is positioned on face of the sea crest during waves such that the incoming kinetic forces of the sea waves falls on the at least one paddle to rotate the at least one paddle. Further, incoming kinetic forces of sea waves rotate the at least one paddle to rotate the generator through the set of gears using the flywheels to generate the electricity. In an embodiment, a height of the pair of towers are adjustable and is dependent on at least one of a height of the sea waves and a size of the plurality of paddles.

FIG. 7a illustrates a cross or diagonal shape row arrangement of the sea wave energy converter system depicted in the FIG. 1 on the seabed/sea shore with individual generator, according to the embodiment as disclosed herein.

As shown in the FIG. 7a, each of the sea wave converter device (100) is line-up in the particular arrangement (i.e., diagonal arrangement or cross arrangement) at different tidal zones of sea. The at least one paddle associated with each of the sea wave converter device (100) is positioned on face of the sea crest during waves such that the incoming kinetic forces of the sea waves falls on the at least one paddle to rotate the at least one paddle. Further, incoming kinetic forces of sea waves rotate the at least one paddle to rotate the each generator through the set of gears using the flywheels to generate the electricity. In an embodiment, a height of the pair of towers are adjustable and is dependent on at least one of a height of the sea waves and a size of the plurality of paddles.

FIG. 7b illustrates a cross or diagonal shape row arrangement of the sea wave energy converter system depicted in FIG. 1 on the seabed with one common main shaft 10 and generator, according to the embodiment as disclosed herein.

As shown in the FIG. 7b, each of the sea wave converter device (100) is line-up in the particular arrangement (i.e., diagonal arrangement or cross arrangement) at different tidal zones of sea. The at least one paddle associated with each of the sea wave conversion device (100) is positioned on face of the sea crest during waves such that the incoming kinetic forces of the sea waves falls on the at least one paddle to rotate the at least one paddle. Each of the sea wave conversion device (100) is lined-up in the particular arrangement covering the length of the sea crest so that incoming kinetic forces of sea waves rotates seriatim the paddle of each of the sea wave conversion device (100) to continue rotate the common generator through the main shaft 10 to generate electricity.

In an example, length of the cross line up of sea wave conversion device (100) depend on wave period, for example wave period is 8 second, so number of installing devices (100) in one cross line up stay on whatever may be within 8 second (round about five to fifteen devices), diagonal distant between two devices variable but desirable and/or depend on wave period, wave length, unit size, and crest height. While diagonal shaped row may be installed any one left or right sides, or both sides ('V' shaped).

FIG. 8 illustrates a cross or diagonal shape row arrangement of the sea wave energy converter system depicted in the FIG. 3a on the seabed with an individual generator, according to the embodiment as disclosed herein.

As shown in the FIG. 8, each of the sea wave converter device (300) is line-up in the particular arrangement (i.e., diagonal arrangement or cross arrangement) at different tidal zones of sea. The at least one paddle associated with each of the sea wave converter device (300) is positioned on face of the sea crest during waves such that the incoming kinetic forces of the sea waves falls on the at least one paddle to rotate the at least one paddle. Further, incoming kinetic forces of sea waves rotate the at least one paddle to rotate the each generator through the set of gears using the flywheels to generate the electricity.

FIG. 9 illustrates a cross or diagonal shape row arrangement of the sea wave energy converter system depicted in the FIG. 3b on the seabed with individual generator, according to the embodiment as disclosed herein.

As shown in the FIG. 9, each pair of sea wave converter device (300) is line-up in the particular arrangement (i.e., diagonal arrangement or cross arrangement) at different tidal zones of sea. Further, the pair of sea wave converter device (300) is arranged opposite to each other. The at least one paddle associated with each pair of the sea wave converter device (300) is positioned on face of the sea crest during waves such that the incoming kinetic forces of the sea waves falls on the at least one paddle to rotate the at least one paddle. Further, incoming kinetic forces of sea waves rotate the at least one paddle to rotate the each generator through the set of gears using the flywheels to generate the electricity.

Figure 10A:
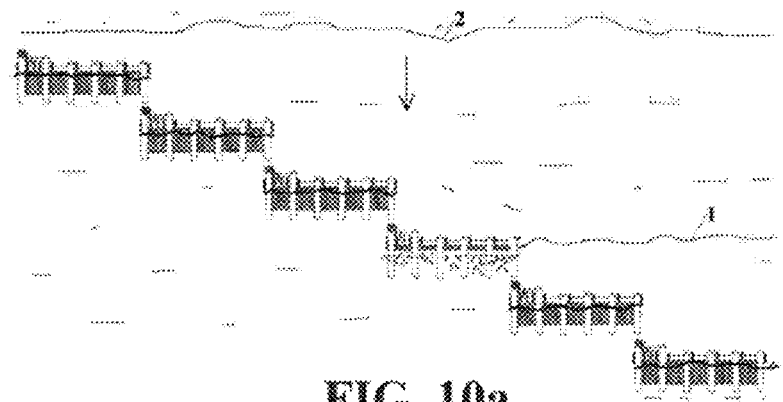
FIG. 10a illustrates row of sea wave energy conversion device of the FIG. 1 installing as cross or diagonal shape line up arrangement on the seabed with individual row wise generator.
Figure 10B:
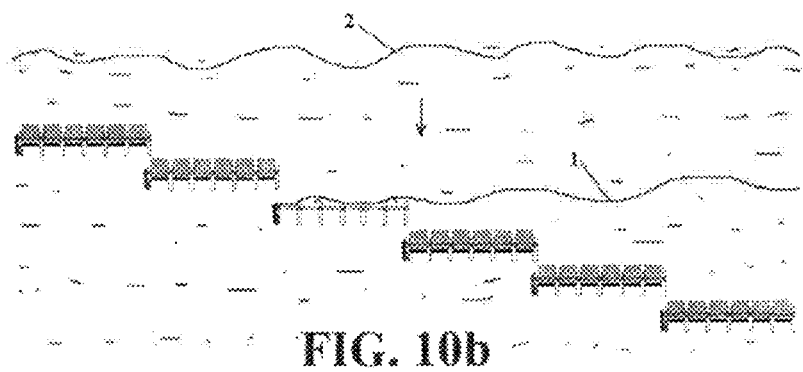
FIG. 10b illustrates row of the sea wave energy converter apparatus of the FIG. 2 installing as cross or diagonal shape row arrangement on the seabed with individual row wise generator.
Figure 10C:
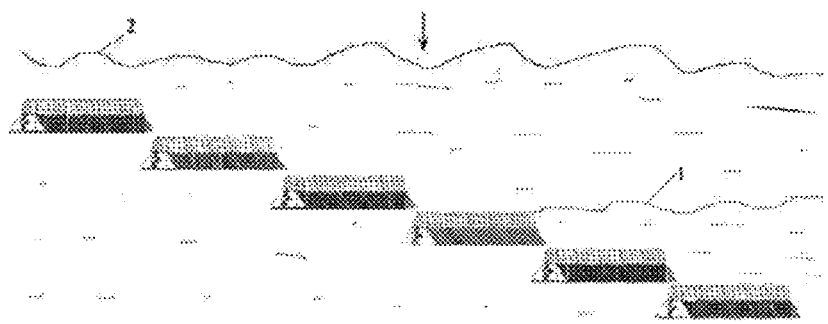
FIG. 10c illustrates row of the horizontal axis sea wave energy converter device of the FIG. 3a installing as cross or diagonal shape row arrangement on the seabed with individual row wise generator.

Referring to FIG. 10a, FIG. 10b, and FIG. 10c a horizontal line up installing row of pioneer device depicted in the FIG. 2, FIG. 1, FIG. 3b and its cross line up installing arrangement of said rows (FIG. 6 to FIG. 11), as such FIG. 10a, FIG. 10b, FIG. 10c.

Thus, one sea wave (1) of FIG. 6, FIG. 7a, FIG. 8, FIG. 9, FIG. 10a, FIG. 10b, and FIG. 10(c) harness seriatim one by one of diagonal shaped line up installing arranged devices. When the sea wave (1) reach a final state, the sea wave (2) start its blowing process and thus this cycle stay on continue for power generation.

Said cross line up of devices having individual gear box with generator FIG. 7a or said cross line up of devices link up horizontal one main shaft 10 of the FIG. 7b with gears, flywheel, and generator of the FIG. 7b.

Length of the cross line up of devices depend on wave period, for example wave period is 8 second, so number of installing devices in one cross line up stay on whatever may be within 8 second (round about five to fifteen devices), diagonal distant between two devices variable but desirable and/or depend on wave period, wave length, unit size, and crest height. While diagonal shaped row may be installed any one left or right sides, or both sides ('V' shaped).

Figure 11:
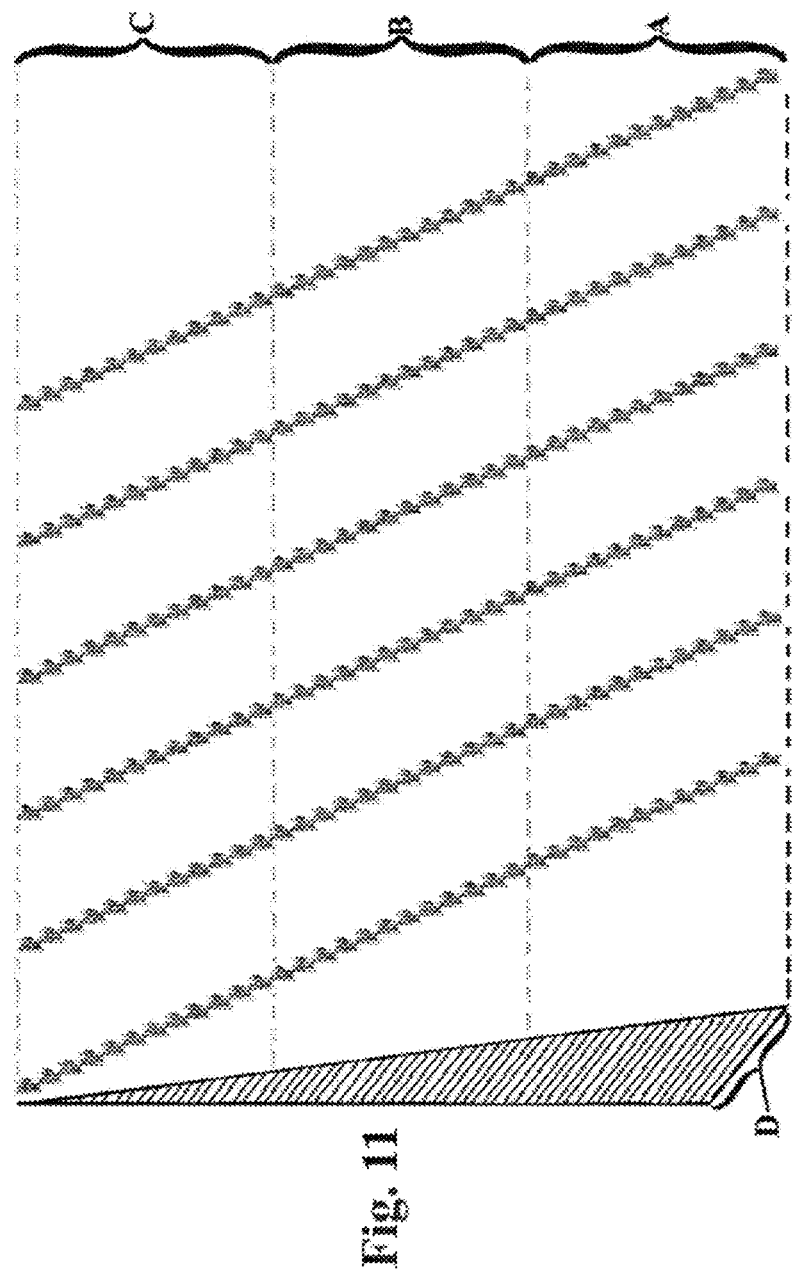
FIG. 11 shows back view of diagonal shape row of the sea wave energy converter depicted in the FIG. 7a as a parallel shape installing long row. Length of row stand between up and down tides movement path, otherwise devices of row works proper in the up-down tides also, according to another embodiment.
Figure 12:
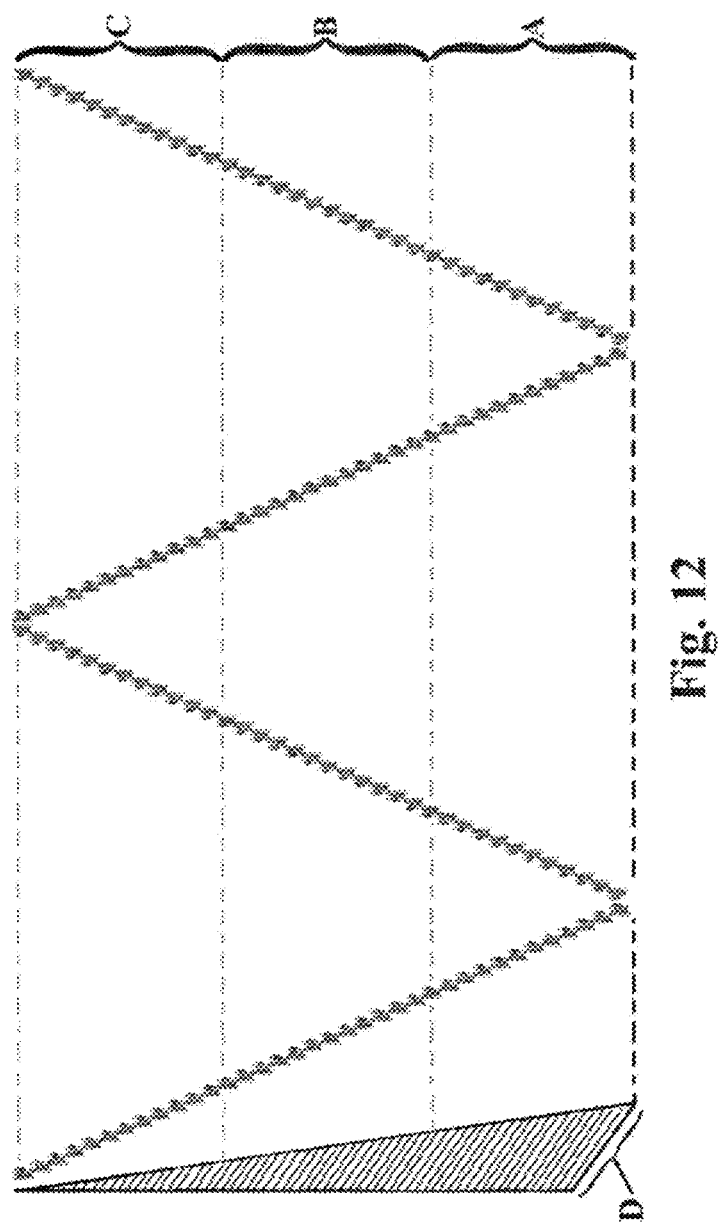
FIG. 12 shows back view of diagonal shape row of the sea wave energy converter depicted in the FIG. 6 as a 'V' shape installing long row. Length of row stand between up and down tides movement path, otherwise devices of row works proper in the up-down tides also, according to another embodiment.

In some configurations and referring to FIG. 11, parallel cross rows (1-6) of the FIG. 11 installing arrangement of pioneer devices of the FIG. 1 or FIG. 2 or FIG. 3a, while referring to FIG. 12 a mirror imaged 'V' shaped row FIG. 12 (1,2) installing arrangement of pioneer devices of the FIG. 1 or FIG. 2 or FIG. 3a. Such parallel cross line up and 'V' shaped arrangement of devices are installed on the seabed; Said arrangements works as tides regularization system.

When, seabed having a slope (d) of the FIG. 11 and FIG. 12, so seabed divided in three zone like 'A' zone, 'B' zone and 'C' zone of the FIG. 11 and FIG. 12, while 'A' zone is high tides area, 'B' zone is medium tides area, 'C' zone is low tides area. Thus length of cross or 'V' shaped line up may be as long until harnessing of sea wave stay on continue within low, medium and high tides. While horizontally length of parallel row (1-6) of the FIG. 1 land 'V' shaped row (1-2) of FIG. 12 may be depend on capacity of project or desirable, for generate desirable grid quality power.

FIG. 10a illustrates row of device FIG. 1 installing as cross or diagonal shape line up arrangement on the seabed with individual row wise generator. FIG. 10b illustrates row of device FIG. 2 installing as cross or diagonal shape row arrangement on the seabed with individual row wise generator. FIG. 10c illustrates row of device FIG. 3a installing as cross or diagonal shape row arrangement on the seabed with individual row wise generator.

As shown in the FIG. 10a, the operations and function of each sea wave conversion device (100) is explained in conjunction with the FIG. 7a. Further, the generator associated with each of the sea wave conversion device (100) is placed in the seabed in a row wise manner.

As shown in the FIG. 10b, the operations and function of each sea wave converter apparatus (200) is explained in conjunction with the FIG. 6. Further, the generator associated with each of the sea wave converter apparatus (200) is placed in the seabed in a row wise manner.

As shown in the FIG. 10c, the operations and function of each sea wave converter device (300) is explained in conjunction with the FIG. 8 and FIG. 9. Further, the generator associated with each of the sea wave converter device (300) is placed in the seabed in a row wise manner.

As shown in the FIG. 6 to FIG. 10c, when the sea wave converter device (100 or 200 or 300 or 400 or 500) reach at final state of the sea shore, the sea wave start its blowing process and thus this cycle stay on continue for power generation.

FIG. 11 shows a back side view of the diagonal shape arrangement of the each sea wave conversion device (100) depicted in the FIG. 7a. The diagonal shape arrangement of the each sea wave conversion device (100) is arranged parallel to each other in the seabed. Length of the diagonal shape arrangement of the each sea wave conversion device (100) is placed between up and down tides movement path.

As shown in the FIG. 11, the length of cross line up of the multistory sea waves harnessing tower may be as long until sea waves harnessing stay on continues within low, medium and high tides. Thus cross line up installing arrangement of multistory towers may be arranged as desirable lengthened parallel row for generating desirable grid quality power.

Figure 13:
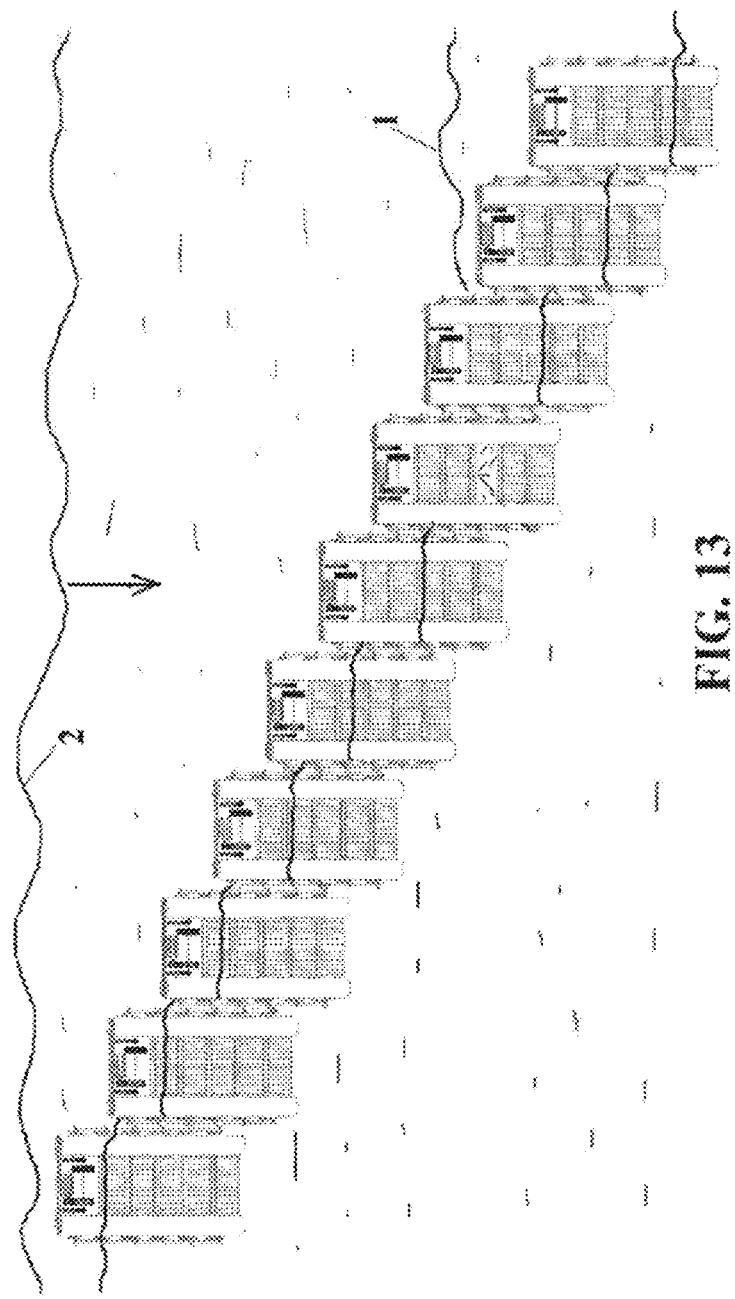
FIG. 13 shows back view arrangement of multistory tower of the FIG. 5 installing as a diagonal shape long row. Length of row stand between up and down tides movement path, otherwise devices of row works proper in the up-down tides also, in accordance with an exemplary embodiment.

In some configurations and referring to FIG. 13 cross line up installing arrangement FIG. 13 of multistory sea waves harnessing devices tower FIG. 5, works as tides regularization arrangement system. According to tides the crest of the sea waves up and down, so any one the similar leveled FIG. 13 paddle of the each multistory tower may be stay on opposite of the sea waves, and thus the harnessing process of the sea waves stay on continues.

FIG. 13 shows back side view of arrangement of multistory tower depicted in the FIG. 5 installing as a diagonal shape long row. Length of row of the multi-story tower is placed between up and down tides movement path. Otherwise, placement of the multi-story tower operates proper in the up-down tides.

The sea wave one (1) FIG. 13 reach final state, the sea wave second (2) FIG. 13 starts its blowing process and thus this cycle stay on continue for power generation.

The length of cross line up of the multistory sea waves harnessing tower may be as long until sea waves harnessing stay on continues; within low, medium and high tides. Thus cross line up installing arrangement of multistory towers may be arranged as desirable lengthened parallel row (1-6) like FIG. 11 for generate desirable grid quality power.

Figure 14:
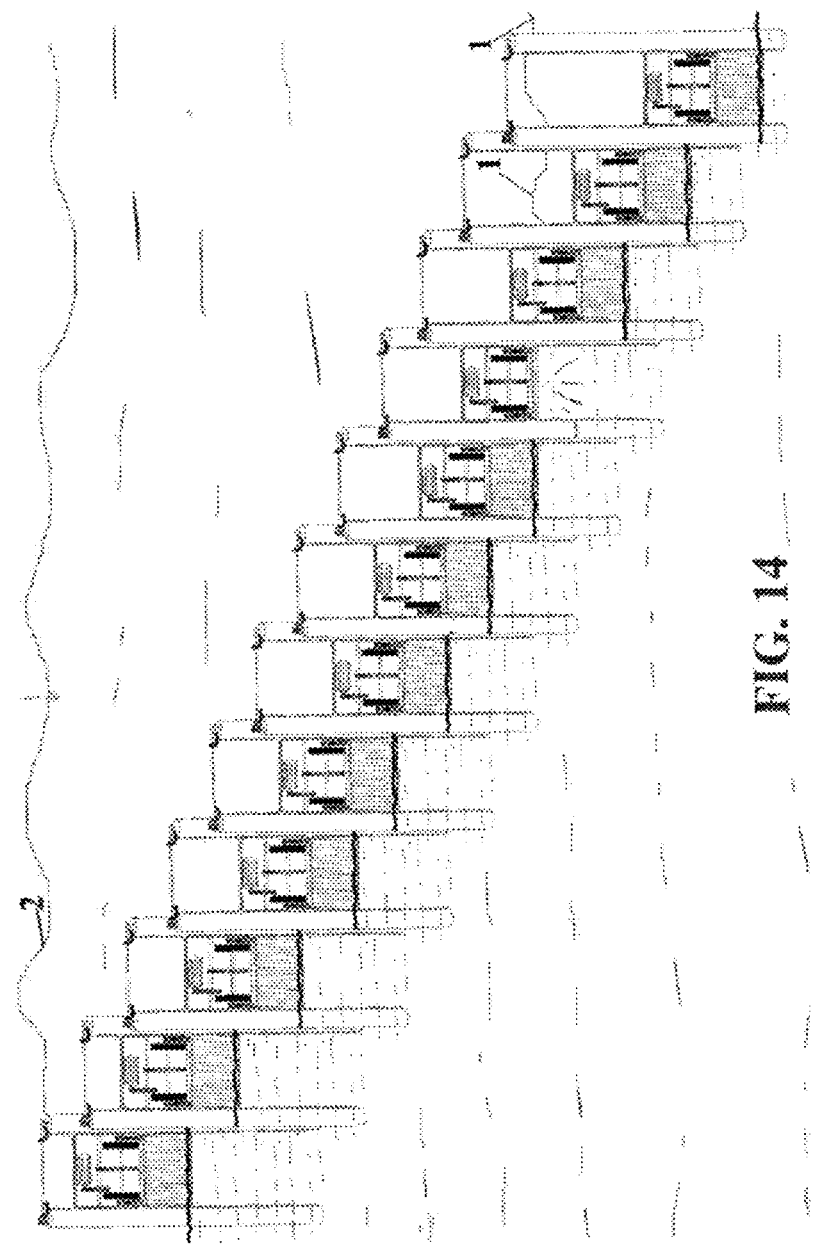
FIG. 14 shows back view arrangement of automatic device of the FIG. 4 installing as a diagonal shape long row, Length of row stand between up and down tides movement path, otherwise devices of row works proper in the up-down tides also, in accordance with an exemplary embodiment.

In some configurations and referring to FIG. 14 cross line up installing arrangement FIG. 14 of automatic sea waves harnessing device tower FIG. 4 is works as tides regularization arrangement system. Thus diagonal shaped line up installing arrangement of automatic towers keeps sea waves harnessing process continues even if low, medium and high tides. According to tides the crest of the sea waves up and down, so paddle of the similar level FIG. 14 of each towers are arrange opposite of the sea wave by automation, and thus the harnessing process of the sea waves stay on continues.

When, first sea wave FIG. 14 harness one by one diagonal shaped line up installing arranged devices, at final state of the first sea wave FIG. 14, the second sea wave FIG. 14 starts harnessing process one by one. Thus seriatim sea waves harnessing process stay on without interrupt.

The length of cross line up of the automatic sea waves harnessing tower may be as long as sea waves harnessing keep stay on continues; within low, medium and high tides. Thus cross line up installing arrangement of automatic towers may be arranged as desirable lengthened parallel row (1-6) like FIG. 11 for generate desirable grid quality power.

FIG. 14 shows back side view arrangement of the sea wave conversion device (400) as depicted in FIG. 4 installing as a diagonal shape long row. The length of row stand between up and down tides movement path, otherwise devices of row works proper in the up-down tides also, in accordance with an exemplary embodiment.

I claim:

1. A sea wave energy converter system, comprising:
a plurality of pioneer devices (100 or 200 or 300a or 300b or 400 or 500) each of which is mounted on individual towers installed at a seabed, wherein each of the pioneer device (100 or 200 or 300a or 300b or 400 or 500) comprises an assembly having a set of gears connected to at least one fly wheel, at least one paddle, and a generator, wherein each of the pioneer devices (100 or 200 or 300a or 300b or 400 or 500) mounted on the individual towers are lined-up in a particular arrangement covering a length of a sea crest so that incoming kinetic forces of sea waves rotates seriatim the at least one paddle of each of the pioneer devices (100 or 200 or 300a or 300b or 400 or 500) to rotate the generator through the set of gears to generate electricity individually by each of the pioneer devices (100 or 200 or 300a or 300b or 400 or 500), wherein the particular arrangement is one of a diagonal arrangement, a cross arrangement, and a 'V' shaped arrangement where each of the pioneer devices (100 or 200 or 300a or 300b or 400 or 500) is lined-up along the particular arrangement whereby no pioneer device obstructs the flow of the sea waves for the subsequent pioneer device so that each of the pioneer devices (100 or 200 or 300a or 300b or 400 or 500) has equal water flow exposure so that the sea wave energy converter system is able to continuously generate electricity, wherein a height of the tower of each of the pioneer devices (100 or 200 or 300a or 300b or 400 or 500) is adjustable and is dependent on at least one of a height of the sea waves and a size of the paddle, and wherein each of the pioneer devices (100 or 200 or 300a or 300b or 400 or 500) are lined-up in the particular arrangement at different tidal zone of sea.

2. The system of claim 1, wherein each of the pioneer devices (100 or 200 or 300a or 300b or 400 or 500) are lined-up in the particular arrangement such that when one of the sea waves reaches at a pioneer device (100 or 200 or 300a or 300b or 400 or 500) from the plurality of pioneer device, another sea wave start rotating the at least one paddle of the remaining pioneer devices (100 or 200 or 300a or 300b or 400 or 500) forming a cycle to generate continuously the electricity by each of the pioneer devices (100 or 200 or 300a or 300b or 400 or 500), and wherein a number of the pioneer devices (100 or 200 or 300a or 300b or 400 or 500) to be lined-up depends on at least one of a periodicity of the sea waves, a length of the sea waves, the height of the sea waves, and a topography of seashore.

3. The system of claim 1, wherein each of the pioneer devices (100 or 200 or 300a or 300b or 400 or 500) is installed on a square frame using screw gears of the towers and are configured to slide in up and down directions on the screw gears of the towers using the square frame.

4. The system of claim 1, wherein a group of the plurality of pioneer devices (100 or 200 or 300a or 300b or 400 or 500) are lined-up in the particular arrangement covering the length of the sea crest so that incoming kinetic forces of sea waves rotates seriatim the at least one paddle of each of the pioneer devices (100 or 200 or 300a or 300b or 400 or 500) to rotate the generator through the set of gears to generate electricity individually by each of the pioneer devices (100 or 200 or 300a or 300b or 400 or 500).

5. The system of claim 1, wherein the plurality of pioneer devices (100 or 200 or 300a or 300b or 400 or 500) are lined-up by grouping a set pioneer devices from the plurality of pioneer devices (100 or 200 or 300a or 300b or 400 or 500) and lining-up each set of pioneer device in the particular arrangement.

6. A sea wave energy converter system, comprising:
a plurality of pioneer devices (100 or 200 or 300a or 300b or 400 or 500) each of which is mounted on individual towers installed at a seabed, wherein each of the pioneer device (100 or 200 or 300a or 300b or 400 or 500) comprises an assembly having a set of gears connected to at least one fly wheel and at least one paddle;
a main shaft (10) connected to each of the pioneer devices (100 or 200 or 300a or 300b or 400 or 500); and
a common generator connected to the main shaft (10), wherein each of the pioneer devices (100 or 200 or 300a or 300b or 400 or 500) are lined-up in a particular arrangement covering a length of a sea crest so that incoming kinetic forces of sea waves rotates seriatim the paddle of each of the pioneer devices (100 or 200 or 300a or 300b or 400 or 500) to rotate the common generator through the main shaft to generate electricity, wherein the particular arrangement is one of a diagonal arrangement, a cross arrangement, and a 'V' shaped arrangement where each of the pioneer devices (100 or 200 or 300a or 300b or 400 or 500) is lined-up along the particular arrangement whereby no pioneer device obstructs the flow of the sea waves for the subsequent pioneer device so that each of the pioneer devices (100 or 200 or 300a or 300b or 400 or 500) has equal water flow exposure so that the sea wave energy converter system is able to continuously generate electricity, and wherein a height of the tower of each of the pioneer devices (100 or 200 or 300a or 300b or 400 or 500) is adjustable and is dependent on at least one of a height of the sea waves and a size of the paddle, and wherein each of the pioneer devices (100 or 200 or 300a or 300b or 400 or 500) are line-up in the particular arrangement at different tidal zones of sea.

7. The system of claim 6, wherein each of the pioneer devices (100 or 200 or 300a or 300b or 400 or 500) are lined-up in the particular arrangement such that when one of the sea waves reaches at a pioneer device (100 or 200 or 300a or 300b or 400 or 500) from the plurality of pioneer device, another sea wave start rotating the paddles of the remaining pioneer devices (100 or 200 or 300a or 300b or 400 or 500) forming a cycle to continuously generate the electricity, and wherein a number of the pioneer devices (100 or 200 or 300a or 300b or 400 or 500) to be lined-up depends on at least one of a periodicity of the sea waves, a length of the sea waves, the height of the sea wave.

8. The system of claim 6, wherein each of the pioneer devices (100 or 200 or 300a or 300b or 400 or 500) is installed on a square frame using screw gears of the towers and are configured to slide up and down in direction on the screw gears of the towers using the square frame.

9. A sea wave converter device (400) comprises:
a pair of towers (403) connected with each other using a motor shaft attached to a stand (414), wherein each of the towers (403) comprising a plurality of screw gears (413) connected using a bearing holder (417), and an electric motor (412); and
a square frame structure (409) connected to at least one paddle (401) and mounted on the pair of towers (403) to slide up and down in direction on the screw gears (413) of the pair of towers (403), wherein the square frame structure (409) comprises an assembly having a set of gears (407a-407e) connected to at least one of a pair of fly wheels (406), the at least one paddle (401), and a generator (408) to generate electricity, wherein incoming kinetic forces of sea waves rotate the at least one paddle (401) to rotate the generator (408) through the set of gears (407a-407e) using the flywheels (406) to generate the electricity,
wherein a height of the pair of towers (403) are adjustable and is dependent on at least one of a height the sea waves and a size of the at least one paddle (401).

10. The sea wave converter device (400) of claim 9, wherein the assembly comprises:
a paddle shaft (404), connected to the square frame structure (409), wherein the at least one paddle (401) is mounted on the paddle shaft (404), and wherein the paddle shaft (404) is mounted or connected on the square frame structure (409) using a free wheel,
a counter shaft (405), connected to the square frame structure (409) using a bearing, comprising the pair of fly wheels (406), a pair of small gears (407a) from the set of gears (407a-407e), and a first big gear (407b) from the set of gears (407a-407e),
a generator shaft (416), connected to the square frame structure (409), comprising a first small gear (407c) from the set of gears (407a-407e) connected to the first big gear (407b) and a second big gear (407d) from the set of gears (407a-407e), and
a second small gear (407e) from the set of gears (407a-407e) connected to the second big gear (407d) and the generator (408) to generate the electricity based on the rotation.

11. The sea wave converter device (400) of claim 9, wherein the electric motor (412) is mounted on top of one tower from the pair of towers (403) using a small gear (410) connected to the stand (414) to maintain a height of the at least one paddle (401), and wherein a big gear (411) is connected to the small gear (410) of the electric motor (412) and is mounted on the plurality of screw gears (413) to maintain the height of the at least one paddle (401).

12. The sea wave converter device (400) of claim 9, wherein the at least one paddle (401) is positioned on a face of a sea crest during waves such that the incoming kinetic forces of the sea waves fall on the at least one paddle (401) to rotate the at least one paddle (401).

13. The sea wave energy converter device of claim 9, wherein the paddle (401) is made from light weight material to increase fast movement of the paddle (401) or from heavy material to increase gravity force for fast restore of the paddles (401).

14. The sea wave energy converter device of claim 9, wherein according to a sea water level of tide and a slope of a seabed, one or more paddle shaft (404) are arranged in parallel to continuously generate the electricity.

15. The sea wave energy converter device of claim 14, wherein power from the one or more paddle shaft (404) are used to generate continuously generate the electricity.

16. A sea wave converter device (500) comprises:
a pair of towers (503) connected with each other using a stand (513), wherein each of the towers (503) comprising a common shaft (511) connected using a bearing holder (512) and bevel gears (509-510); and
an assembly comprising a plurality of paddles (501) arranged in tiers (A-E) connected at different levels to the pair of towers (503), at least a pair of fly wheels (506), a set of gears (507a-507d) and a generator (508) to generate electricity, wherein incoming kinetic forces of sea waves rotate at least one paddle from the plurality of paddles (501) to rotate the generator (508) through the set of gears (507a-507d) using the flywheels (506) to generate the electricity,
wherein a height of the pair of towers (503) are adjustable and is dependent on at least one of a height the sea waves and a size of the plurality of paddles (501).

17. The sea wave converter device (500) of claim 16, wherein the assembly comprises:
a paddle shaft (504), connected to the pair of towers (503), comprising a freewheel, wherein the paddle shaft (504) is attached to the pair of towers (503) using a bearing (502);
a counter shaft (515a), connected to the pair of towers (503), comprising the pair of fly wheels (506), a first big gear (507a) from the set of gears (507a-507d),
a generator shaft (515b), connected to the pair of towers (503), comprising a first small gear (507b) from the set of gears (507a-507d) connected to the first big gear (507a) and a second big gear (507c) from the set of gears (507a-507d), and
a second small gear (507d) from the set of gears (507a-507d) connected to the second big gear (507c) and the generator (508) to generate the electricity based on the rotation.

18. The sea wave converter device (500) of claim 16, wherein the at least one paddle (501) is positioned on a face of a sea crest during waves such that the incoming kinetic forces of the sea waves falls on the at least one paddle (501) to rotate the at least one paddle (501).

19. The sea wave energy converter device (500) of claim 16, wherein the paddles (501) are made from lightweight material to increase fast movement of the paddles (501) or from heavy material to increase gravity force for fast restore of the paddles (501).

20. The sea wave energy converter device (500) of claim 16, wherein according to a sea water level of the tide and a slope of a seabed, one or more paddle shaft (504) are arranged in parallel to continuously generate the electricity.

21. The sea wave energy converter device (500) of claim 20, wherein power from the one or more paddle shaft (504) are used to generate continuously generate the electricity.

* * * * *